United States Patent
Hazan et al.

(10) Patent No.: US 7,730,000 B2
(45) Date of Patent: Jun. 1, 2010

(54) METHOD OF DEVELOPING SOLUTIONS FOR ONLINE CONVEX OPTIMIZATION PROBLEMS WHEN A DECISION MAKER HAS KNOWLEDGE OF ALL PAST STATES AND RESULTING COST FUNCTIONS FOR PREVIOUS CHOICES AND ATTEMPTS TO MAKE NEW CHOICES RESULTING IN MINIMAL REGRET

(75) Inventors: Elad Eliezer Hazan, Santa Clara, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 12/134,073

(22) Filed: Jun. 5, 2008

(65) Prior Publication Data
US 2008/0306891 A1    Dec. 11, 2008

Related U.S. Application Data

(63) Continuation of application No. 11/759,505, filed on Jun. 7, 2007.

(51) Int. Cl.
*G06F 15/18* (2006.01)
*G06F 17/16* (2006.01)

(52) U.S. Cl. .................................. 706/12; 705/14.43
(58) Field of Classification Search .................. 706/12
See application file for complete search history.

(56) References Cited

OTHER PUBLICATIONS

Zinkevich, Online Convex Programming and Generalized Infinitesimal Gradient Ascent, 2003.*
Beg et al., Some Fixed Point Theorems in Convex Metric Spaces, 1991.*

* cited by examiner

*Primary Examiner*—David R Vincent
*Assistant Examiner*—Nathan H Brown, Jr.
(74) *Attorney, Agent, or Firm*—Shimokaji & Assoc, P.C.

(57) ABSTRACT

Methods, systems, and computer program products are provided for the online convex optimization problem, in which the decision maker has knowledge of the all past states and resulting cost functions for his previous choices and attempts to make a new choice that results in minimum regret. The method does not rely upon the structure of the cost function or the characterization of the states and takes advantage of the similarity between successive states to enable the method to converge to a reasonably optimal result.

14 Claims, 3 Drawing Sheets

METHOD OF DEVELOPING SOLUTIONS FOR ONLINE CONVEX OPTIMIZATION PROBLEMS WHEN A DECISION MAKER HAS KNOWLEDGE OF ALL PAST STATES AND RESULTING COST FUNCTIONS FOR PREVIOUS CHOICES AND ATTEMPTS TO MAKE NEW CHOICES RESULTING IN MINIMAL REGRET

BACKGROUND OF THE INVENTION

The present invention relates generally to the field of artificial intelligence and, more specifically, to a method of predicting future outcomes that successively approach an optimum through the use of machine learning.

The field of machine learning is generally considered to be a broad subfield of artificial intelligence. Machine learning deals generally with the development of algorithms, methods, and techniques that allow computers to "learn" methods. Research in the area of machine learning research is generally focused on automating statistical methods for efficient use by software agents. Machine learning has a wide spectrum of applications including natural language processing, pattern recognition, search engines, medical diagnosis, bioinformatics, detecting credit card fraud, stock market analysis, classifying DNA sequences, speech and handwriting recognition, object recognition in computer vision, robotic locomotion, optimization, and game playing, to name a few.

More particularly, in the areas of optimization and game playing, an interesting set of problems relates to the so-called "experts problem", which may be expressed in the following manner. A decision maker relies upon the advice of various "experts" in attempting to predict an event, such as whether or not it will rain the next day. The decision maker has access to the experts, each of which provides a prediction based on previous observations. The decision maker uses an algorithm that combines the advice of these experts. Such an algorithm employed by the decision maker is called an experts algorithm. Known experts algorithms usually guarantee that, after many iterations, the number of mistakes that the algorithm makes will be approximately at least as good as that of the best expert, in retrospect.

An even more general framework, which encompasses the experts problem, is referred to as the online convex optimization (OCO) problem. However, the OCO problems that are described in the prior art do not utilize "state information". In the example given above, suppose that the decision maker also has access to various measurements, such as, for example, temperature and cloud location. Intuitively, this information could potentially improve the performance of the decision maker, but it is not clear a priori how to model prior information in the online learning framework.

One approach is to attempt to learn the correlation, if any, between the given information and the observable data and to use such correlation to predict future behavior. However, the information, e.g., temperature, may or may not be correlated with the actual observations, e.g., whether or not it later rains. Even more so, it is conceivable that the state information may be strongly correlated with the observations, but this correlation is very hard to extract. For example, the prior knowledge could be encoded as a solution to a computationally hard problem or even an uncomputable one. Such approaches are not generally thought to be robust or practical.

Another approach is to associate different experts with different decision states and then use standard expert algorithms to predict future behavior. The problem with such an approach is that the number of states grows exponentially with the dimension of the state space. Therefore, this approach quickly becomes infeasible even for a modest amount of prior information. Other difficulties with this approach arise when the domain of the attributes is infinite.

Sill another approach is that used in the model for portfolio management with side information introduced by T. M. Cover and E. Ordentlich, in their book entitled "Universal Portfolios with Side Information" 42:348-363, 1996. Their approach handles discrete side information, and amounts to handling different side information values as separate problem instances. The measure of performance in their model is the standard "regret" metric. The concept of regret comes from the field of Decision Theory. The regret of the decision maker after T steps is defined as the difference between the total cost that the decision maker has actually incurred and the minimum cost that the decision maker could have incurred by choosing a certain point repeatedly.

It is apparent that a new approach to the solution to online convex optimization problems is needed, which does not assume anything about the distribution of the data, prior information, or correlation between the two. The measure of performance should be comparative, i.e., based on an extension of the concept of regret. This approach should take into account the geometric structure of the available information space.

SUMMARY OF THE INVENTION

The invention provides a system for iteratively producing decisions in an OCO framework given structured state information. The method comprising the system guarantees that the decisions produced thereby will incur small regret. In case the data and state information are generated from an unknown joint distribution, the method guarantees that the predictions converge to the optimal predictions given the state information. The system comprises procedures for collecting information known by a decision maker at time T, the collection of known information comprising a set of decisions $x_1, \ldots, x_{t-1}$ made by a decision maker prior to time T, a set of state variables $k_1, \ldots, k_{t-1}$, and a sequence of T convex functions of the form $f_t$, each convex function mapping a convex set P into the set R of the real numbers ($f_t: P \to R$) for $t=1, 2, \ldots, T$; selecting a state vector $\tilde{k}_t$ from a plurality of known state vectors for which a distance between the selected state vector and each state vector from the plurality of state vectors is less than a threshold value $\epsilon$; developing a new state vector based upon the selected state vector; and determining a cost associated with the new state vector.

The invention also provides a method for choosing the successive solutions $x_t$ for $t=1, 2, \ldots$ to an online convex optimization problem, where the functions $f_{t-1}$, the decision maker's previous choices $x_1, \ldots, x_{t-1}$, and the current state vector $k_t \in I$, and all previous state vectors $k_1, \ldots, k_{t-1}$ are known, where $k_t \in [0,1]^d$, I is a metric space having a distance function and a diameter W, the metric space I being a subset of d-dimensional Euclidean space ($1 \subseteq R^d$), and P is a convex set with diameter D with the vectors $x_t \in P$ for $t=1, 2, \ldots, T$. The method may comprise the steps of: choosing a Lipschitz-constant L for the metric space I; choosing a threshold value $\epsilon$; setting $N=\phi$ for N as a subset of I; setting $x_0$ to an arbitrary value for $t=0$; initializing an iteration value t equal to 1; and while $t \leq T$, executing the steps of choosing the state $\tilde{k}_t$ that is closest to $k_t$ among all state vectors in N by setting $\tilde{k}_t = \arg\min \{\|k-k_j\|: k \in N\}$; setting $x_t \leftarrow M(\tilde{k}_t)$ for $t \neq 0$; setting $$y \leftarrow \prod_P \left( M(\tilde{k}_t) - \frac{1}{\sqrt{T}} \nabla f_t(M(\tilde{k}_t)) \right),$$

where $\Pi_P$ denotes the projection operator into the convex set P; updating $M(\tilde{k}_t) \leftarrow y$ if $\|\tilde{k}_t - k_t\| \leq \epsilon$; adding $k_t$ to the set N and setting $M(k_t) \leftarrow y$ if $\|\tilde{k}_t - k_t\| > \epsilon$; and incrementing t by 1.

The invention also provides a tangible computer readable medium containing a computer program comprising a mathematical framework describing an online convex optimization problem for a physical system at time t, the mathematical framework including among other items a Lipschitz-constant L for a metric space I with a diameter D; a time period T; a cost function $f_{t-1}$; a current state vector $k_t \in I$ and all previous state vectors $k_1, \ldots, k_{t-1}$; a threshold value $\epsilon$; and a null set $N=\phi$; a distance operation for selecting a state vector $\tilde{k}_t$ chosen to be closest to state vector $k_t$ from among all state vectors in N according to the operation of $\tilde{k}_t = \arg\min\{\|k - k_t\| : k \in N\}$; an initial condition achieved by setting $x_t \leftarrow M(\tilde{k}_t)$ for $t \neq 0$ and setting $x_0$ arbitrarily for $t=0$; an operation for choosing a vector y chosen according to the operation $$y \leftarrow \prod_P \left( M(\tilde{k}_t) - \frac{1}{\sqrt{T}} \nabla f_t(M(\tilde{k}_t)) \right),$$

where $\Pi_P$ denotes the projection operator into the convex set P; an updating operation consisting of updating $M(\tilde{k}_t) \leftarrow y$ if $\|\tilde{k}_t - k_t\| \leq \epsilon$; and an additive operation consisting of adding $k_t$ to the set N and setting $M(k_t) \leftarrow y$ if $\|\tilde{k}_t - k_t\| > \epsilon$, so that the operations are executed within the mathematical framework to arrive at a feasible solution to the online convex optimization problem.

The invention also provides a computer program product comprising a computer useable medium having a computer readable program, such that the computer-readable program when executed on a computer causes the computer to: define a metric space I having a diameter D; define a set N, wherein $N \subseteq I$; define a convex compact set $P \subset R^n$ having a diameter W, wherein the set P is a feasible domain for solutions to an online convex optimization problem; define a mapping M that maps every point in the set N to a point in decision space P; accept as input Lipschitz-constant L for a metric space I; a time period T; a cost function $f_{t-1}$; a current state vector $k_t \in I$, all previous state vectors $k_1, \ldots, k_{t-1}$; and a threshold value $\epsilon$; set as an initial condition set $x_0$ arbitrarily for $t=0$; set $x_t \leftarrow M(\tilde{k}_t)$ for $t \neq 0$; calculate a state vector $\tilde{k}_t$ chosen to be closest to each state vector $k_t$ from among all state vectors in N; choose a vector y according to the criterion $$y \leftarrow \prod_P \left( M(\tilde{k}_t) - \frac{1}{\sqrt{T}} \nabla f_t(M(\tilde{k}_t)) \right),$$

where $\Pi_P$ is a projection operator into the convex set P; update $M(\tilde{k}_t) \leftarrow y$ if $\|\tilde{k}_t - k_t\| \leq \epsilon$; and add $k_t$ to the set N and setting $M(\tilde{k}_t) \leftarrow y$ if $\|\tilde{k}_t - k_t\| \geq \epsilon$.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide methods for use by a decision maker in solving an online convex optimization (OCO) problem in which some prior information is known. The acceptability of the solution thus obtained may be determined by quantifying the amount of regret the decision maker may have when the decision maker discovers how much his selected solution differs from the solution provided by the best expert in hindsight. The invention provides a method for which such regret calculated for the decision maker's solution is bounded.

The invention may be used in a machine learning environment in which the decision maker has knowledge about solutions presented by other "experts', i.e. by other predictive means, for the same problems and the costs associated with those solutions, as well as a knowledge of his own previous solutions. The decision maker may also have knowledge as to the experts' solutions to the present problem so that he can provide his own solution; the cost of the decision maker's solution is not known until after the fact. These inventive methods allow the decision maker to take advantage of the similarity between consecutive state vectors of known solutions provided in the past by these other predictive means without knowing the process by which those other predictive means arrive at a solution. The invention is amenable to any environment in which computational means are available for developing, calculating, and storing the previous state vectors so that problems in which large numbers of such states may be addressed. Problems of this dimension are typically encountered in the areas of artificial intelligence and/or machine learning.

The invention may provide methods, systems, and computer program products to enable the decision maker to develop solutions for the online convex optimization problem, when the decision maker has knowledge of the all past states and resulting cost functions for his previous choices and attempts to make a new choice that results in a minimal regret. Solutions to the OCO problem provided in the prior art generally depend upon a knowledge of the past cost functions and do not depend upon a knowledge of the past states. The present invention does not rely upon the structure of the cost function used in calculating the value of regret or upon the characterization of the states, as is done in the prior art. Instead, it takes advantage of the similarity between successive states to enable successive solutions made by the decision maker to eventually converge to a reasonably optimal result.

Figure 1:
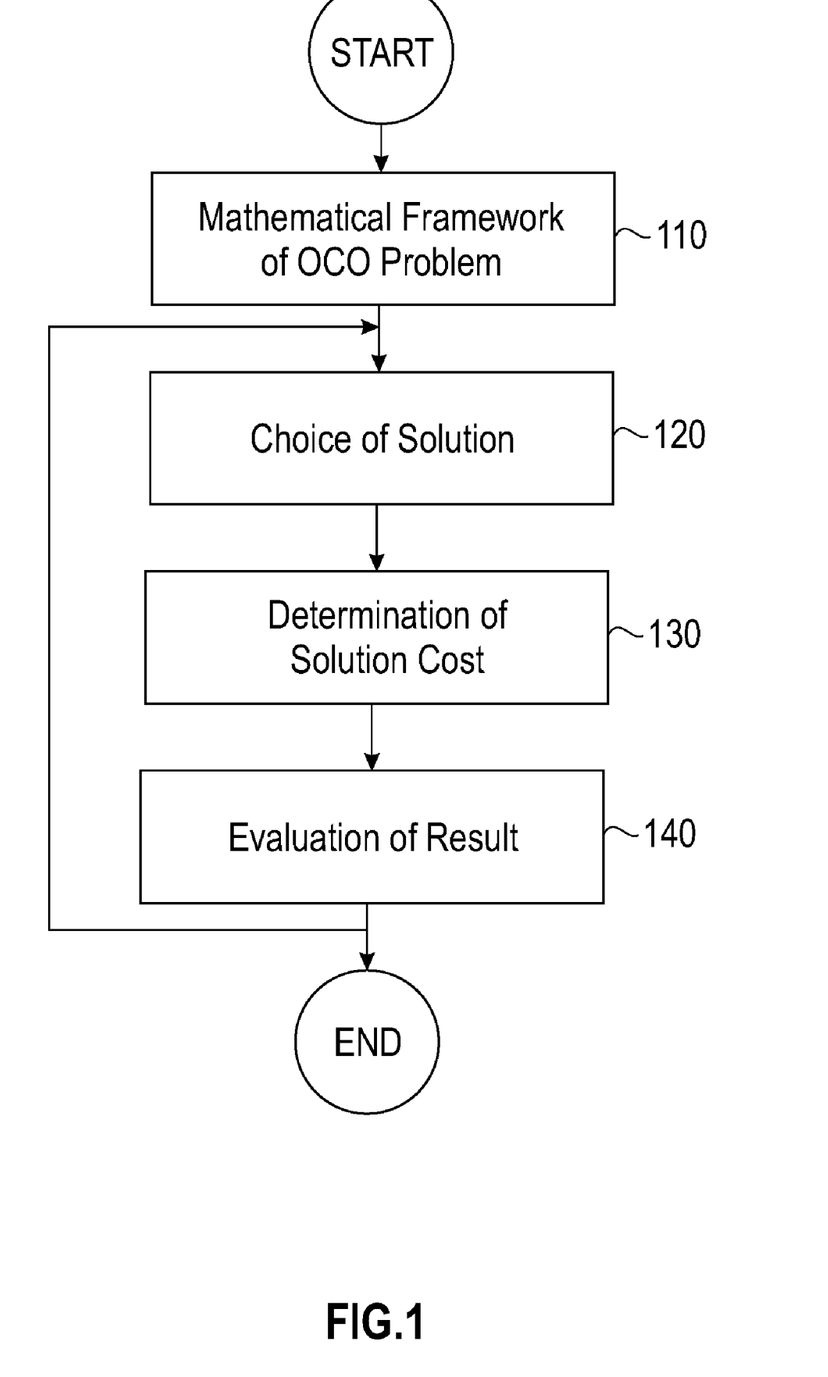
FIG. 1 shows a schematic diagram of the general architecture of the online optimization problem, according to an embodiment of the invention.

Referring now to FIG. 1, showing the overall structure of the invention, the mathematical framework of an OCO problem may be described, according to the block labeled 110. A feasible domain of the OCO problem may be described as a convex compact set $P \subset R^n$. An adversary may pick the cost functions, which may be different at different time periods. Predictive methods may be used by the experts to arrive at solutions to the OCO problem, but the decision maker has no knowledge of the adversary's choice of the current cost function. The convex compact set P must necessarily contain all feasible solutions for the decision maker. The adversary picks a sequence of T convex functions $f_t$: P→R for t=1, 2, ..., T. The adversary is not restricted otherwise. At time t (t=1, 2, ...), the decision maker may only know the functions $f_1, \ldots, f_{t-1}$ his previous choices $x_1, \ldots x_{t-1}$ and the states $k_1, \ldots k_t$. Given this information, the decision maker must pick a point in the domain of feasible solutions, i.e. $x_t \in P$, which may represent the decision maker's best estimate as to the optimal solution, given knowledge of the prior states and functions, according to the block labeled 120. After making the choice $x_t$, the decision maker is then informed in full about the adversary's function $f_t$ and a cost $f_t(x_t)$ that his solution incurs, according to the block labeled 130. The regret that the decision maker has, as described below, may then be determined, according to the block labeled 140.

For notational purposes, [n] may be defined as being the set of all integers from 1 through n, i.e. $[n]=\{1, \ldots, n\}$. The gradient (also designated in some sources as the Hessian) of a mapping $f$:P α R at $x \in P$ may be denoted by $\nabla f(x)$ (resp. $\nabla^2 f(x)$). For a family of loss functions $\{f_t(\cdot):t \in [T]\}$ and an underlying convex set P, we may denote an upper bound on the $l_2$-norm of the gradients by $$G=\max\{\|\nabla f t(x)\|_2 : t \in [T], x \in P\}.$$

In the same manner, $G_\infty$ may denote an upper bound on the $l_\infty$-norm.

The regret of the decision maker after T steps may be defined mathematically as the difference between the total cost that the decision maker has actually incurred and the minimum cost that the decision maker could have incurred by choosing a certain point repeatedly throughout. More precisely, the regret R may be denoted according to the following equation:

$$R = R(x_1, \ldots x_T; f_1, \ldots f_T) \triangleq \sum_{t=1}^T f_t(x_t) - \min_{x \in P} \sum_{t=1}^T f_t(x)$$

If the method used by the decision maker to make the sequential choices is denoted by A, then A may be viewed as sequence of mappings $(A_t:t=1, 2, \ldots)$, so that $x_t = A_t(f_1, \ldots, f_{t-1})$. For notational brevity, define $x^T=(x_1, \ldots, x_T)$, $f^T=(f_1, \ldots, f_T)$, and $x^T=A(f^{T-1})$ The worst-case regret from a method A at time T can be defined as $$Regret_T(A) \triangleq \sup_{f^T} R(A(f^{T-1}), f^T)$$

In other words, $$Regret_T(A) = \sup_{f_1, \ldots, f_T} \left\{ \sum_{t=1}^T f_t(x_t) - \min_{x \in P} \sum_{t=1}^T f_t(x) \right\}$$

The traditional approach to the OCO problem seeks methods that minimize the worst-case regret.

The invention may extend the common OCO problem to situations in which the decision maker has some information about the "state" prior to his choice of $x_t$. Specific situations may be considered where some state information may be revealed to the decision maker, but not the entire state. In order to do this, the invention may reformulate an OCO problem with known state information as an equivalent OCO problem without state information.

To motivate the method of formulating this equivalence, a simplified OCO problem may be considered. Within the mathematical framework of this simplified OCO problem, the feasible solutions which form the domain may be a set that is on a Euclidian unit ball, i.e. $B_n = \{x \in R^n : \|x\|_2 \leq 1\}$. As a simplifying assumption, it may further be assumed that $f_1$ is linear, i.e. that this function has the form $f_t(x) = c_t^T x$ for some $c \in R^n$. As another simplifying assumption, require that $c_t \in [-1,1]^n$. Since the decision maker may have knowledge of only a portion of the state information, then the known quantity may be chosen as being the first coordinate of $c_t$ (denoted by $c_{t1}$). For this scenario, there may exist a method having a worst-case regret of $O(n^2 \log T)$ if $c_{t1}$ is bounded away from 0.

In order to reformulate the OCO problem with state information as an equivalent OCO problem without state information, we may modify the convex cost function in the following manner. Suppose the coordinates of $y_t = (x_{t2}, \ldots x_{t,n})$ have been fixed so that $\|y_t\|^2 \leq 1$. The notation $\|y_t\|^2$ may denote the square of the standard Euclidian norm, i.e. the sum of the squares of each coordinate of $y_t$. Then the optimal choice of $x_{t1}$, subject to the constraint $\|x_t\|^2 \leq 1$, may be $$x_{t1} = \begin{cases} \sqrt{1-\|y_t\|^2} & \text{if } c_{t1} < 0 \\ -\sqrt{1-\|y_t\|^2} & \text{if } c_{t1} \geq 0. \end{cases}$$

In other words, $$x_{t1} = -\text{sgn}(c_{t1}) \cdot \sqrt{1-\|y_t\|^2}$$

The cost of choosing $y_t$ and completing it with an optimal choice of $x_{t1}$ may be $$g_t(y_t) = \frac{c_{t2}x_{t2} + \ldots + c_{tn}x_{tn} - |c_{t1}|\sqrt{1-\|y_t\|^2}}{\sqrt{1-\|y_t\|^2}} = u_t^T y_t - |c_{t1}|$$

where $$u_t = (c_{t2}, \ldots, c_{tn})^T$$

Thus, this problem may be equivalent to an OCO problem in which the decision maker has to choose vector $y_t$ and the adversary picks cost functions of the form of $g_t$ where $c_{t1}$ is known to the decision maker. The decision maker may be provided with a series of known payoff functions $g_1, \ldots g_{t-1}$ of the form $$g_t(y_t) = \frac{c_{t2}x_{t2} + \ldots + c_{tn}x_{tn} - |c_{t1}|\sqrt{1-\|y_t\|^2}}{\sqrt{1-\|y_t\|^2}} = u_t^T y_t - |c_{t1}|$$

where $$u_t = (c_{t2}, \ldots, c_{tm})^T$$

for some $c \in R^n$. The decision maker may also recall his previous choices $x_1, \ldots, x_{t-1}$.

Therefore, according to the previous discussion, the invention may provide the following method, ALG1, by which the decision maker may first choose vectors based on weights, which may be updated in a multiplicative fashion. Let $$w_t(y) = \exp\left\{-\alpha \sum_{t=1}^{t-1} g_t(y)\right\}$$

Thus, $$w_t(y) = w_{t-1}(y) \cdot \exp\{-\alpha g_{t-1}(y)\}.$$

The weight function $w_t(\cdot)$ may determine the choice of $y_t$ as follows, where $P = B_{n-1}$:

$$y_t = \frac{\int_P y \cdot w_t(y) dy}{\int_P w_t(y) dy} \in P$$

It should be noted here that $y_t$ may be a convex combination of points in P and hence $y_t \in P$. The corresponding vector $x_t$ in the OCO problem with state information may then be expressed as the following:

$$(x_{t2}, \ldots, x_{tm})^T = y_t$$

$$x_{t1} = \begin{cases} \sqrt{1 - \|y_t\|^2} & \text{if } c_{t1} < 0 \\ -\sqrt{1 - \|y_t\|^2} & \text{if } c_{t1} \geq 0 \end{cases}$$

If $\rho = \min\{|c_{t1}|: t = 1, \ldots, T\}$, then it can be readily shown that the worst-case regret of ALG1 may be at most $(4n^2/\rho) \cdot \log T$.

The general OCO problem may now be recharacterized in order to include state information as being known prior to the act of the decision maker making a decision. To capture state information, the mathematical framework of the OCO problem as defined previously in FIG. 1, block 110, may be revised by modeling the state information as a vector in a metric space I, which may also be called the information space. In iteration t, an online method A may be modified to accept not only $f_{t-1}$ and $x_{t-1}$, as described previously, but also a current state vector $k_t \in I$ as well as all previous state vectors $k_1, \ldots, k_{t-1}$.

The information space I, which may serve as a model for prior information that is known to the decision maker, may be defined to be a general metric space so that both scalar quantities (e.g., temperature) and problem-specific quanta (e.g., board configurations in the game of chess) may be represented. However, as a simplifying limitation, the information space I may also be defined to be a subset of d-dimensional Euclidean space, i.e. $I \subseteq R^d$. In either case, the information space I may also be the general metric space or a more sharply defined space without departing from the scope of the invention. The space must be at least be metric, however, so that the method can take advantage of similarity between consecutive state vectors, where this similarity is measured according to some distance function. Note that ignoring the similarity between successive states is equivalent to employing disjoint sets of experts in different states. For purposes of this description, the intrinsic dimensionality of the Euclidean space, denoted d, may be considered to be the standard dimension.

If $L > 0$ denotes the Lipschitz constant for the convex set P, then $X_L$ may denote a family of mappings x from the information space I to the convex set P of feasible solutions to the OCO problem ($x: I \alpha P$). This means, for a distance function on the convex set P, that $$\|x(k_1) - x(k_2)\| \leq L \cdot \|k_1 - k_2\|$$

for all $k_1, k_2 \in I$. Then, the L-regret from a sequence of choices $x_1, \ldots, x_T$ may be defined as follows:

$$\sum_{t=1}^{T} f_t(x_t) - \min_{x \in X_L} \sum_{t=1}^{T} f_t(x(k_t))$$

When L and $k_1, \ldots, k_T$ have been fixed, then a minimizer of $$\sum_{t=1}^{T} f_t(x(k_t))$$

may be denoted as the term $x^*(\cdot)$.

Thus, the actual costs may be compared with the costs that could be incurred by the best experts in a family of experts with Lipschitz-constant L. Note that this definition reduces to the standard regret when $L = 0$. If $L = \infty$, then L-regret is the "competitive ratio" studied in competitive analysis of online algorithms. This model for prior information may allow for methods which attain sublinear L-regret for $0 < L < \infty$.

Figure 2:
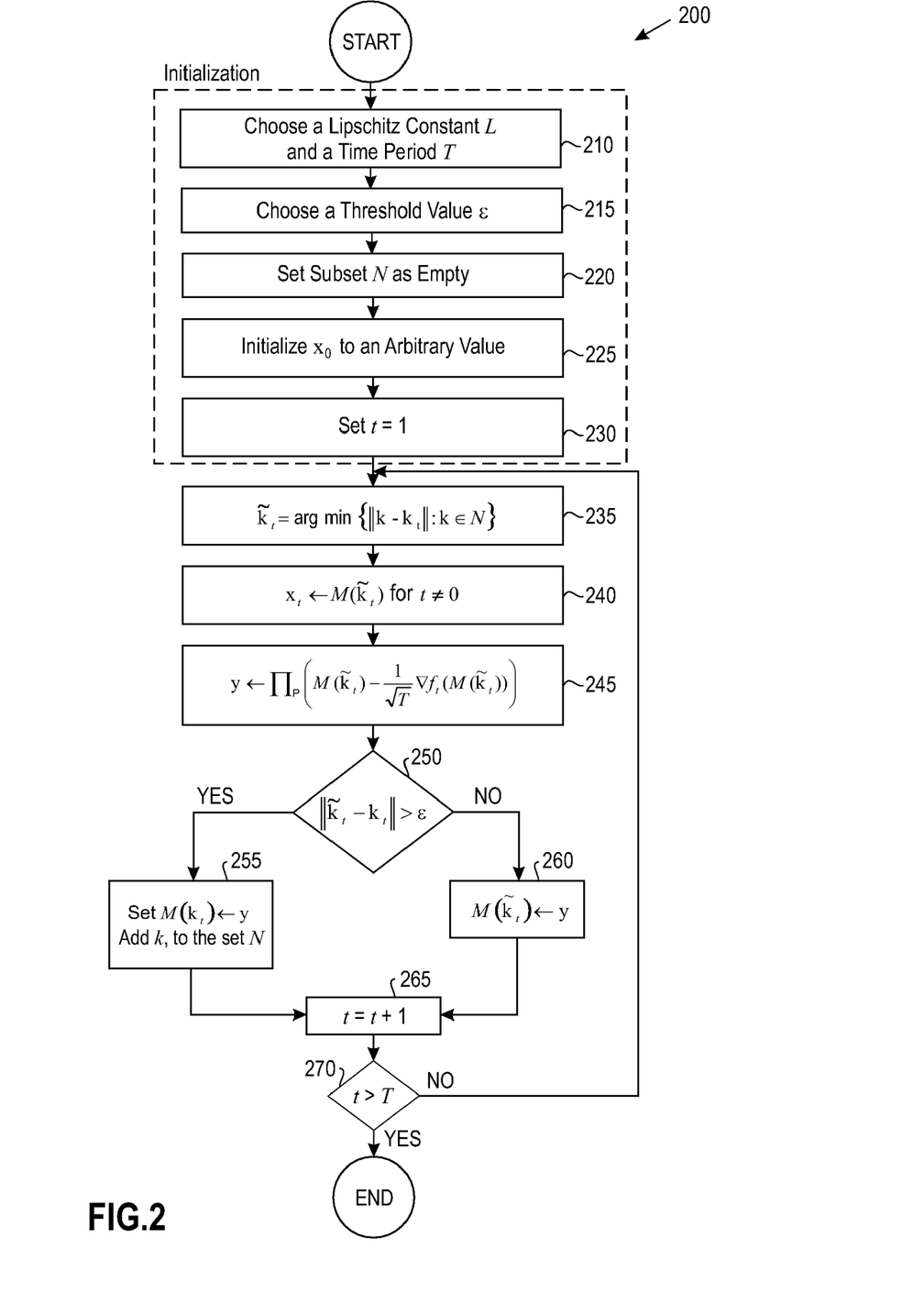
FIG. 2 is a flow diagram of a method of solving an online convex optimization problem, according to an embodiment of the invention.

Referring now to FIG. 2, another embodiment 200 of the invention may be described as a method that attains a non-trivial, worst-case L-regret as a bound. In order to discuss the mathematical framework within which the method is executed, the concept of an $\epsilon$-net may be defined as follows: a subset $N \subseteq I$ of the metric space having a distance function $\Delta$ may be defined as an $\epsilon$-net for the set $S \subseteq I$, if for every $x \in S$, it is true that $$\Delta(x, N) \equiv \inf\{\Delta(x,y) | y \in N\} \leq \epsilon$$

and also that $$\Delta(x,y) \geq \epsilon$$

for every $x, y \in N$. M may denote a mapping from all points in N to the decision space P, i.e. $M: N \alpha P$. Further, D may denote the diameter of P and W may denote the diameter of the information space I. Finally, for each value of t, let $k_t \in [0,1]^d$ as a simplifying assumption.

Referring now to FIG. 2, which may describe an embodiment 200 of the invention, a Lipschitz-constant L and a number of time periods T may be chosen initially as constants for the operation of the method, according to block 210. The decision maker may also set a threshold value $\epsilon$ to use in determining whether or not to add a state vector to the set N, according to the block labeled 215; for purposes of this method, an efficient value of $\epsilon$ has been determined to be $\epsilon = W(D/L)^{2/(d+2)} T^{-1/(d+2)}$. Finally, the set N may be initially empty so that it is equated to the null set, i.e. $N = \phi$, according to the block labeled 220. The value of $x_0$ may initially be set to an arbitrary number, according to the block labeled 225.

A main loop of the method may be performed T times for $t=1, \ldots, T$. for each iteration of the main loop, the decision maker may calculate a particular state vector $\tilde{k}_t$, which may be described as the state that is closest to $k_t$ among all state vectors in N, i.e., $\tilde{k}_t = \arg\min \{\|k-k_t\| : k \in N\}$, according to the block labeled 235. The decision maker may set $x_t \leftarrow M(\tilde{k}_t)$, according to the block labeled 240.

In order to ensure that a real number solution to the function M corresponds to a feasible solution in P, a projection operator $\Pi_P$ may be defined as a mapping of real numbers onto the convex set P of feasible solutions, i.e. $\Pi_P : R^n \alpha P$. Using the projection operator, the decision maker may then set $$y \leftarrow \prod_P \left( M(\tilde{k}_t) - \frac{1}{\sqrt{T}} \nabla f_t(M(\tilde{k}_t)) \right),$$

according to the block labeled 245.

If the distance between the minimum distance $\tilde{k}_t$ and each vector $k_t$ is less than an amount $\epsilon$, i.e. if $\|\tilde{k}_t - k_t\| \leq \epsilon$, as shown in block 250, then the decision maker may update $M(\tilde{k}_t) \leftarrow y$ as shown in block 260 (note that the size of N does not increase); otherwise, the decision maker may add $k_t$ to the set N and may also set $M(k_t) \leftarrow y$ for the next iteration of the main loop, as shown in block 255. The value of t may be incremented according to the block labeled 265. A check of t may be made in the block labeled 270, and the main loop is repeated if $t>T$, according to the block labeled 270. Otherwise, the main loop terminates. If the method is repeated for T iterations, then it may terminate with a value of L-regret that is bounded. Given a Lipschitz constant L, a convex set P and a time period T, it can be shown that:

$$L\text{-regret} = O\left(WGL^{(1-\frac{2}{d+2})}D^{(\frac{2}{d+2})}T^{1-\frac{1}{d+2}}\right).$$

The method 200 may be modified by employing different techniques for making the best choice, other than by using the online gradient descent step inside the main loop, without departing from the scope of the invention. This may occasionally lead to a more efficient algorithm. For example, if the underlying convex set P is the n-dimensional simplex, then using the standard multiplicative-weights online algorithm can lead to the following regret bound:

$$L\text{-regret}_{MW} = O\left(WG_\infty L^{(1-\frac{2}{d+2})}D^{(\frac{2}{d+2})}T^{(1-\frac{1}{d+2})}\sqrt{\log n}\right).$$

Another possible variant of method 200 may be to replace the optimization algorithm update with a Newton-type update rather than a gradient update. Such second-order algorithms are known to achieve substantially lower regret when the cost functions are exp-convex and may be used without departing from the scope of the invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining both hardware and software elements. In a preferred embodiment, the invention is implemented in software, which includes but is not limited to firmware, resident software, microcode, etc.

Figure 3:
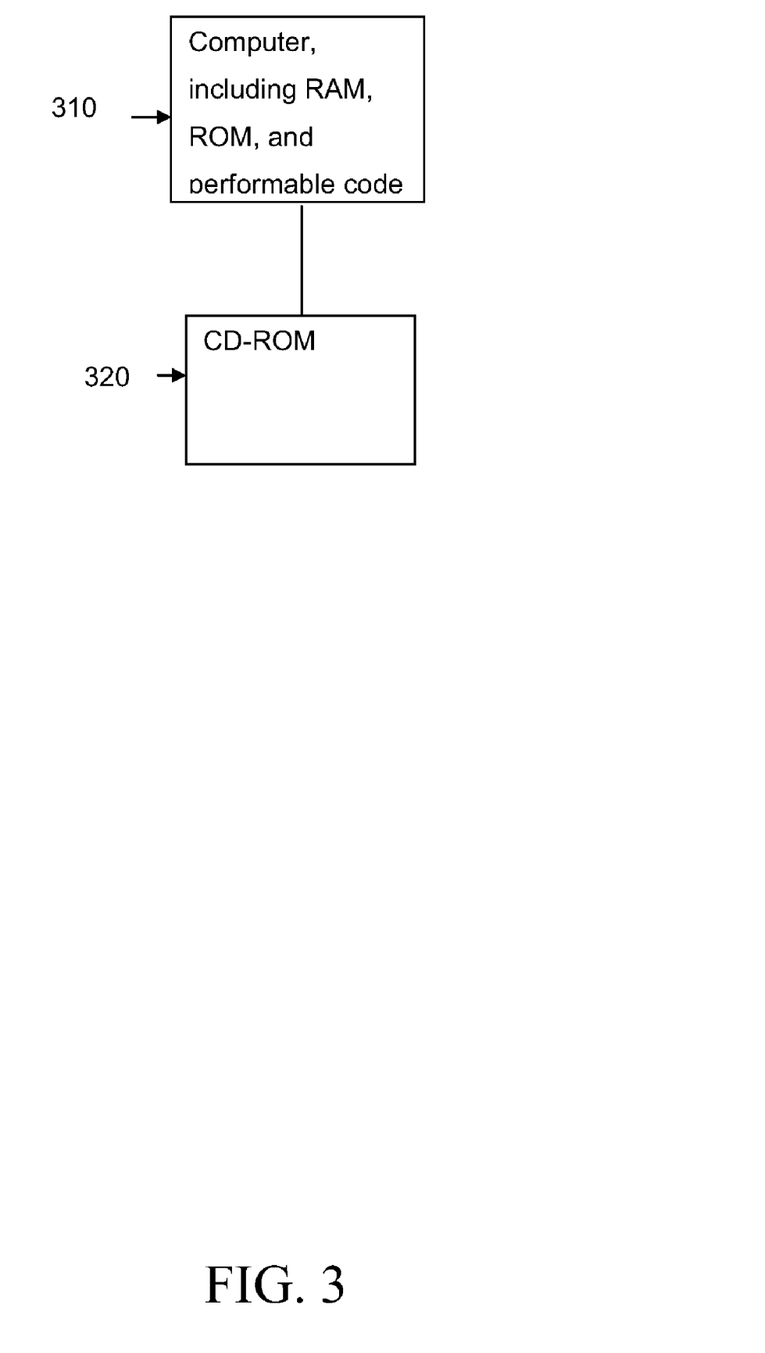
FIG. 3 shows a block diagram of the invention using a computer.

FIG. 3 shows a block diagram of the invention using a computer. The invention can take the form of a computer program product accessible from a computer-usable or computer-readable medium providing program code for use by or in connection with a computer 310, or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM) 310, a read-only memory (ROM) 310, a rigid magnetic disk and an optical disk. Current examples of optical disks include compact disk—read only memory (CD-ROM) 320, compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A system for iteratively improving a chosen solution to an online convex optimization problem, the system executing procedures for:

collecting known information with a computer known by a decision maker at time T, the collection of known information comprising a set of past decisions $x_1, \ldots, x_{t-1}$ made by a decision maker prior to time T, a set of state variables $k_1, \ldots, k_t$, and a sequence of T−1 convex functions of the form $f_t$, each convex function mapping a convex set P into a set R of real numbers $$(f : \mathcal{P} \rightarrow R) \text{ for } t = 1, 2, \ldots, T-1;$$

selecting a state vector $\tilde{k}$, from a plurality of known state vectors for which a distance between the selected state vector and each state vector from the plurality of state vectors is less than a threshold value $\epsilon$, wherein the selecting of the state vector $\tilde{k}_t$ is based on weights that are updated in a multiplicative fashion, wherein a weight function $$w_t(y) = w_{t-1}(y) \cdot \exp\{-\alpha g_{t-1}(y)\}, \text{ and}$$

$$y_t = \frac{\int_{\mathcal{P}} y \cdot w_t(y) dy}{\int_{\mathcal{P}} w_t(y) dy} \in \mathcal{P},$$

represented with respect to pay-off function $g_{t-1}$, and wherein a worst-case regret is $$(4n^2/\rho) \cdot \log T;$$

developing a new state vector based upon the selected state vector; and
determining a cost associated with the new state vector;
determining a level of regret that the decision maker has regarding the decision maker's past decisions $x_1, \ldots, x_{t-1}$ based on a difference between a total cost the decision maker incurred and a minimum cost the decision maker could have incurred by a repeated choice; and
transforming the cost associated with the new state vector for display on an output device.

2. The system given in claim 1, wherein each state vector $k_t$ is a member of a metric space 1 ($k_t \epsilon T$), wherein the metric space 1 has a diameter W and a distance function for calculating the distance between any two members of the metric space 1.

3. The system given in claim 2, wherein the distance function is the Euclidean norm.

4. The system given in claim 2, wherein a Lipschitz constant L is chosen for the metric space 1.

5. The system given in claim 4, wherein the threshold value $\epsilon$ is chosen so that $$\varepsilon = W(D/L)^{2/(d+2)} T^{-1/(d+2)},$$

wherein D is a diameter of P.

6. The system given in claim 1, wherein the system is implemented on a general purpose computer.

7. A method for choosing a solution $x_t$ at time t (t=1, 2, ...) to an online convex optimization problem, the method accepting $f_{t-1}$, $x_{t-1}$, the current state vector $k_t \epsilon l$, and all previous state vectors $k_1, \ldots, k_{t-1}$, wherein $k_t \epsilon [0,1]^d$, wherein l is a metric space having a distance function and a diameter W, the metric space l being a subset of d-dimensional Euclidean space ($T \subseteq R^d$), and wherein P is a convex set with diameter D with the vectors $x_t \epsilon P$ for t=1, 2, ..., T, the method comprising the steps of:
choosing a Lipschitz-constant L for the metric space l;
choosing a threshold value $\epsilon$;
setting N=$\phi$, wherein N is a subset of l;
setting $x_0$ to an arbitrary value for t=0;
initializing an iteration value t within a computer processor equal to 1; and while $t \leq T$, executing the steps of:
choosing the state $\tilde{k}_t$ that is closest to $k_t$ among all state vectors in N by setting $$\tilde{k}_t = \arg\min\{\|k - k_t\| : k \in \mathcal{N}\};$$

setting $$x_t \leftarrow \mathcal{M}(\tilde{k}_t) \text{ for } t \neq 0;$$

setting $$y \leftarrow \prod_P \left( M(\tilde{k}_t) - \frac{1}{\sqrt{T}} \nabla f_t(M(\tilde{k}_t)) \right),$$

where
$\Pi_P$ denotes the projection operator into the convex set P;
updating $$\mathcal{M}(\tilde{k}_t) \leftarrow y \text{ if } \|\tilde{k}_t - k_t\| \leq \varepsilon,$$

adding $k_t$ to the set N and setting $$\mathcal{M}(k_t) \leftarrow y \text{ if } \|\tilde{k}_t - k_t\| > \varepsilon, \text{ and}$$

incrementing t by 1; and transforming the set N for display on an output device.

8. The method of claim 7, wherein the worst case value of L-regret is at most $$O\left(WGL^{(1-\frac{2}{d+2})} D^{(\frac{2}{d+2})} T^{1-\frac{1}{d+2}}\right).$$

9. The method of claim 7, wherein the threshold value is chosen to be the value $$\varepsilon = W(D/L)^{2/(d+2)} T^{-1/(d+2)}.$$

10. A computer containing a computer program comprising:
a mathematical framework performed on the computer describing an online convex optimization problem for a physical system at time t, the mathematical framework comprising:
a Lipschitz-constant L for a metric space l with a diameter D;
a time period T;
a cost function $f_{t-1}$;
a current state vector $k_t \epsilon T$ and all previous state vectors $k_1, \ldots, k_{t-1}$;
a threshold value $\epsilon$; and
a null set N=$\phi$;
a distance operation for selecting a state vector $\tilde{k}_t$ chosen to be closest to state vector $k_t$ from among all state vectors in N according to the operation of $$\tilde{k}_t = \arg\min\{\|k - k_t\|: k \in \mathcal{N}\};$$

an initial condition achieved by setting $x_t \leftarrow M(\tilde{k}_t)$ for $t \neq 0$ and setting $x_0$ arbitrarily for $t=0$; an operation for choosing a vector y chosen according to the operation $$y \leftarrow \prod_P \left( M(\tilde{k}_t) - \frac{1}{\sqrt{T}} \nabla f_t(M(\tilde{k}_t)) \right),$$

where $\Pi_P$ denotes the projection operator into the convex set P;

an updating operation consisting of updating $$\mathcal{M}(k_t) \leftarrow y \text{ if } \|\tilde{k}_t - k_t\| \leq \varepsilon; \text{ and}$$

an additive operation consisting of adding $k_t$ to the set N and setting $$\mathcal{M}(k_t) \leftarrow y \text{ if } \|\tilde{k}_t - k_t\| > \varepsilon;$$

wherein the operations are executed within the mathematical framework to arrive at a feasible solution to the online convex optimization problem and the operations are transformed for display on an output device.

11. A computer program product comprising a computer having a computer readable program, wherein the computer readable program when executed on a computer causes the computer to:

define a metric space l within a computer processor on the computer having a diameter D;

define a set N, wherein $N \subseteq T$;

define a convex compact set $P \subset R^n$ having a diameter W, wherein the set P is a feasible domain for solutions to an online convex optimization problem;

define a mapping M that maps every point in the set N to a point in decision space P;

accept as input Lipschitz-constant L for a metric space l; a time period T; a cost function $f_{t-1}$; a current state vector $k_t \in T$, all previous state vectors $k_1, \ldots, k_{t-1}$; and a threshold value $\varepsilon$;

set as an initial condition $x_t \leftarrow M(\tilde{k}_t)$ for $t \neq 0$;

set $x_0$ arbitrarily for $t=0$;

calculate a state vector $\tilde{k}_t$ chosen to be closest to each state vector $k_t$ from among all state vectors in N;

choose a vector y according to the criterion $$y \leftarrow \prod_P \left( M(\tilde{k}_t) - \frac{1}{\sqrt{T}} \nabla f_t(M(\tilde{k}_t)) \right),$$

where $\Pi_p$ is a projection operator into the convex set P;

update $$\mathcal{M}(k_t) \leftarrow y \text{ if } \|\tilde{k}_t - k_t\| \leq \varepsilon; \text{ and}$$

add $k_t$ to the set N and setting $$\mathcal{M}(k_t) \leftarrow y \text{ if } \|\tilde{k}_t - k_t\| > \varepsilon;$$

and transforming $M(\tilde{k}_t)$ for display on an output device.

12. A computer program product given in claim 11, wherein $k_t \in [0,1]^d$.

13. The computer program product given in claim 11, wherein the state vector $\tilde{k}_t$ chosen to be closest to each state vector $k_t$ from among all state vectors in N is calculated as $$\tilde{k}_t = \arg\min\{\|k - k_t\|: k \in \mathcal{N}\}.$$

14. The computer program product given in claim 11, wherein the value of $\varepsilon$ is $$\varepsilon = W(D/L)^{2/(d+2)} T^{-1/(d+2)}.$$

* * * * *